Jan. 24, 1956 T. ROTTER 2,732,147
SPINNING REEL

Filed Jan. 19, 1953 2 Sheets-Sheet 1

INVENTOR.
Theodore Rotter

Jan. 24, 1956 T. ROTTER 2,732,147
SPINNING REEL

Filed Jan. 19, 1953 2 Sheets-Sheet 2

INVENTOR.

Theodore Rotter

United States Patent Office 2,732,147
Patented Jan. 24, 1956

2,732,147

SPINNING REEL

Theodore Rotter, Denver, Colo., assignor of thirty-five per cent to Charles E. Friend, Denver, Colo.

Application January 19, 1953, Serial No. 331,792

1 Claim. (Cl. 242—84.4)

This invention relates to a reel which has for its primary object the provision of means for assuring an evenly spaced parallel and level wind of the line on the spool of the reel.

A further object lies in the provision of a reel having a locking mechanism by which a casting and level wind arm is locked and rigid while in the casting or spinning position, thereby preventing deviation of this arm from its normal position.

A further important object of the invention resides in the provision of a reel which prevents tangling, looping, collapsing, and binding of the line on casting or retrieving of the line.

An additional object of the invention resides in the provision of a reel which will provide greatly reduced friction in the spinning or reeling of the line upon casting.

One of the features of the invention is the automatic mechanism by which the casting and level wind arm is thrust upward in a level wind position by turning of the handle.

These, together with the various ancillary objects and features of the invention which will become apparent as the following description proceeds, are attained by this reel, a preferred embodiment of which is shown in the accompanying drawings, wherein.

Figure 1:
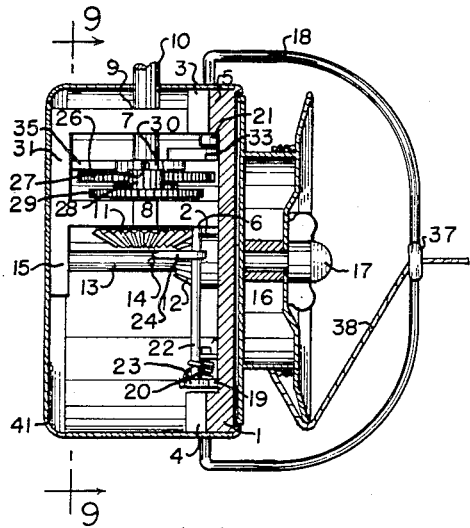
Figure 1 is a vertical cross sectional view of the reel.
Figure 9:
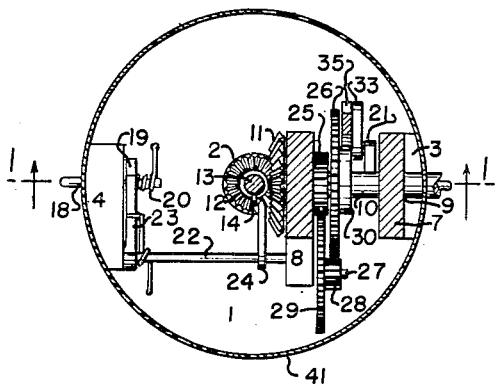
Figure 8:
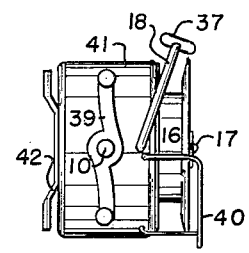

Figure 8 is a side elevational view of the reel with the casting and level-wind arm in a retrieved position and showing the eye member thereof in position directly above the level-wind portion of the spool. This view also shows the point from which the ends of the casting and level-wind arm emerge through the case; and Figure 9 is a sectional detail view of the reel as taken along the plane of line 9—9 in Figure 1.

With continuing reference to the accompanying drawings wherein like reference numerals designate similar parts through the various views, reference numeral 1 generally indicates a plate which is provided with bearings 2, 3, 4, 5 and 6. A bearing frame 7 is mounted on the plate 1.

The bearing frame 7 is provided with bearings 8, 9, 15 and 31.

Journaled in the bearings 8 and 9 is a drive shaft 10. This drive shaft 10 is provided with a bevel gear 11 which drives a pinion gear 12. The pinion gear 12 is mounted securedly on a shaft 13. The shaft 13 is journaled in bearing 15 of the bearing frame 7 and bearing 2 of the plate 1.

On shaft 13 there is mounted a pin 14 and spool 16 secured by a nut 17. Journaled in the bearings 3 and 4 of plate 1 are the ends of casting and level-wind arm 18. This can be seen best in Figure 1. To the end of the casting and level-wind arm 18 there is secured a catch 19 and a spring 20. To the opposite end of the casting and level-wind arm 18 there is secured a level-winder lever 21. See Figures 2 and 3.

Figure 3:
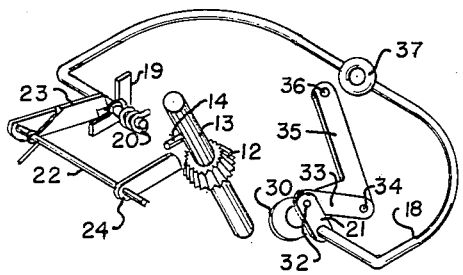
Figure 3 is a perspective view of the trip mechanism in a retrieve and level-wind position.
Figure 4:
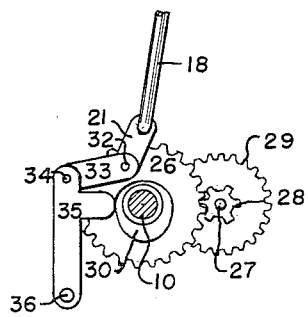
Figure 4 is a perspective view of the level-wind gear train.

Held in bearings 5 and 6 of the plate 1 is a shaft 22. A pawl 23 and a pawl release lever 24 is secured to the shaft 22 as can be seen also in Figures 2 and 3. Secured on the drive shaft 10 is a drive gear 25 of the level-wind gear train. Also on the drive shaft 10 and free to rotate is the driven gear 26 as seen in Figure 4.

Mounted on the bearing frame 7 is a countershaft 27. Free to rotate on the countershaft 27 is a drive gear 28 and a driven gear 29. Hence gears 25 and 29 and gears 26 and 28 have common centers producing a low ratio. Mounted securely to the driven gear 26 is a level-wind cam 30. Jointed on the level-wind level 21 by means of a pin 32 is a level-wind link 33. Jointed on line 33, by means of a pin 34, is a level-wind cam lever 35. There is mounted on the level-wind lever 35 a small screw 36 which is journaled in the bearing 31 of frame 7. Positioned in the center of the casting and level-wind arm 18 is a suitable eye member 37 through which a fishing or other line 38 is passed. At the end of the drive shaft 10 there is a detachable handle 39.

In the operation of the reel, a fishing or other line 38 must be level-wound on the spool 16, first by mounting the reel, by reel member 42, on the reel seat of a suitable pole. Then, the end of a fishing or other line 36 is threaded through the line guides of the pole and through the eye member 37 and securely tied around the line holding portion of the spool 16. By turning handle 38, casting and level-wind arm 18 is made to move back and forth across the face of the line holding portion of the spool 16 by action of the level-wind mechanism.

Figure 7:
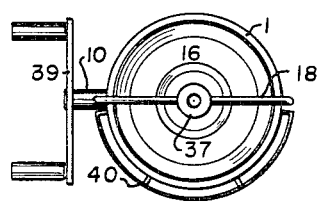
Figure 7 is a top view of the reel with the casting and level-wind arm in a casting or spinning position and illustrating the guard, handle, and top of the spool and a part of the shaft of the reel.
Figure 5:
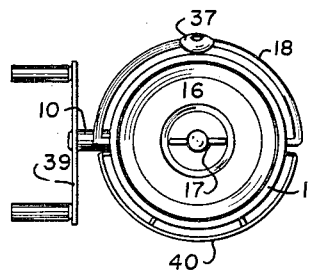
Figure 5 is a plan view of the reel in the retrieve or level-wind position.
Figure 6:
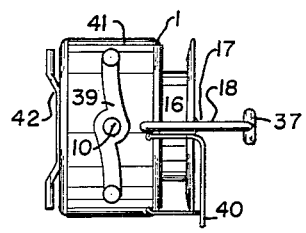
Figure 6 is a side elevational view of the reel with the level-wind arm in casting or spinning position.

Before a cast is made, level-wind arm 18 is manually pressed down to its normal position with the eye member 37 thereof directly above the center of the top or spinning end of the spool 16 as can be readily seen in Figures 6 and 7. At the same instance, catch 19 is rotated by action of the casting or level-wind arm 18 until it falls behind the notch in pawl 23.

Figure 2:
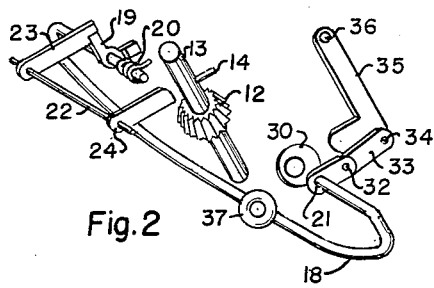
Figure 2 is a perspective view of the trip mechanism while in a casting or spinning position.

The level-wind arm 18 is now locked rigid in a casting or spinning position as can be seen best in Figures 2, 6 and 7 thus preventing deviation of the casting and level-wind arm 18 from its normal position. With suitable weight or bait attached to the end of the line 38, the cast is made and the line uncoils, spins and comes off the spool 16 in a substantially spinning or uncoiling motion through the eye member 37 while the spool 16 is stationary.

To retrieve the line 38 on the spool 16, handle 39 is turned. This rotates shaft 10 with the bevel gear 11 which, in turn, rotates pinion 12, the shaft 13, spool 16 and the pin 14. When the pin 14 strikes the pawl release lever 24, pawl 23 is thrust upwardly releasing the catch 19. The spring 20 lifts the casting and level-wind arm 18 to a position approximately parallel to the line holding portion of spool 16 and the casting and level-wind arm 18 is in a retrieved, rewind, or level-wind position as can be seen best in Figure 8. At the same instant, level-wind lever 21 through link 33 brings the level-wind cam lever 35 to engagement with the face of the cam 30 as shown in Figure 3.

By continued turning of the handle 39 and through the level-wind gear train shown in Figure 4, the cam 30 is made to turn over slowly and through cam lever 35, link 33 and level-wind lever 21, the casting or level-wind arm 18 is made to move back and forth across the face of the line holding portion of the spool 16 while the latter is turning on the shaft 13 thus evenly winding the coils of the line 38 on the line holding portion of spool 16 next to the last coil thereon in a straight, parallel, and evenly spaced manner, ready for another cast, without any looping, tangling, collapsing or binding of the line.

One shot lubrication of the inside working parts of the reel, inside the case 41 is accomplished by detaching handle 38. Several drops of oil may then be put into the port opening into the center of the shaft 10, the oil permeating each working part through this hollow shaft.

A guard 40 mounted on the case 41 is so placed and spaced as in Figure 8 to prevent undue looping of the line between the spool 16 and eye member 37. The case 41 is tightly fitted for removal and is rigidly attached to the frame 7 thus sealing off dirt, moisture and chemicals from the inside working parts of the reel. The member 42, attached firmly to the frame 7 channeled through the case 41, mounts the reel on the fishing or other pole.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

A casting reel comprising a mounting plate, a driven shaft journaled in said mounting plate, a line carrying spool mounted on said driven shaft, a U-shaped winding arm having a pair of ends pivotally mounted on said mounting plate and carrying a line guide, drive means for rotating said driven shaft to wind line on said spool, locking means attached to said mounting plate and to one of the pair of ends of said winding arm for holding said winding arm in a lowered position normal to said spool and with said line guide in alignment with the axis of rotation of said driven shaft, means on said driven shaft for unlocking said locking means when said driven shaft is rotated, means for oscillating said winding arm when said winding arm is in a raised position, a frame member attached to said mounting plate, said means for driving said driven shaft including a drive shaft journaled in said frame member, a first bevel gear on said drive shaft, said driven shaft having a second bevel gear mounted thereon engaging said first bevel gear, said means for oscillating said winding arm including a cam rotatably mounted on said drive shaft and means for rotating said cam at a slower rate than the rate of rotation of said driven shaft including a reducing gear assembly connected to said driven shaft and said cam and a linkage connected to the other of the pair of ends of said winding arm engaging said cam.

References Cited in the file of this patent
UNITED STATES PATENTS

| | | |
|---|---|---|
| 2,512,170 | Oen | June 20, 1950 |
| 2,586,921 | Delphon | Feb. 26, 1952 |
| 2,590,369 | Beeler | Mar. 25, 1952 |
| 2,617,611 | Meierjohan | Nov. 11, 1952 |
| 2,634,920 | Dunn | Apr. 14, 1953 |

FOREIGN PATENTS

| | | |
|---|---|---|
| 482,763 | Canada | Apr. 29, 1952 |